United States Patent [19]

Fradenburgh

[11] 4,216,924
[45] Aug. 12, 1980

[54] HELICOPTER

[75] Inventor: Evan A. Fradenburgh, Fairfield, Conn.

[73] Assignee: United Technologies Corporation, Hartford, Conn.

[21] Appl. No.: 971,161

[22] Filed: Dec. 20, 1978

[51] Int. Cl.² .................................................. B64C 27/04
[52] U.S. Cl. ............................ 244/17.11; 244/17.27; 415/DIG. 1; 416/245 R; 244/207
[58] Field of Search ............... 244/17.11, 17.27, 130, 244/207; 416/245 R; 415/DIG. 1; D12/73

[56] References Cited

U.S. PATENT DOCUMENTS

| | | | |
|---|---|---|---|
| D. 239,930 | 5/1976 | Ulisnik | D12/73 |
| 3,062,483 | 11/1962 | Davidson | 244/207 |
| 3,130,942 | 4/1964 | Fradenburgh | 244/207 |
| 3,920,203 | 11/1975 | Moorehead | 244/207 |

Primary Examiner—Charles E. Frankfort
Attorney, Agent, or Firm—Vernon F. Hauschild

[57] ABSTRACT

An improved helicopter designed to create minimum drag and turbulence in which the main rotor pylon has a top surface having a forward portion defining the rotor head well aperture so as to have a selectively curved lip on the rearward side thereof to eliminate flow separation therefrom of the air being discharged rearwardly from the rotor head well, further having a central portion curving slightly away from the direction of helicopter flight and including a laterally extending boundary layer slot a selected distance downstream of the curved lip through which fluid is expelled substantially parallel to the direction of helicopter flight to energize the surface flow along the pylon top surface, further having a rear portion at a lower elevation extending approximately in the direction of helicopter flight, and having engine and other exhaust ports positioned a selected distance downstream of the boundary layer control slot through which the exhaust fluids are directed over the rear portion in a direction substantially parallel to the direction of helicopter flight, and terminating in a sharp lip to separate the exhaust flow from the pylon surface thereat.

15 Claims, 13 Drawing Figures

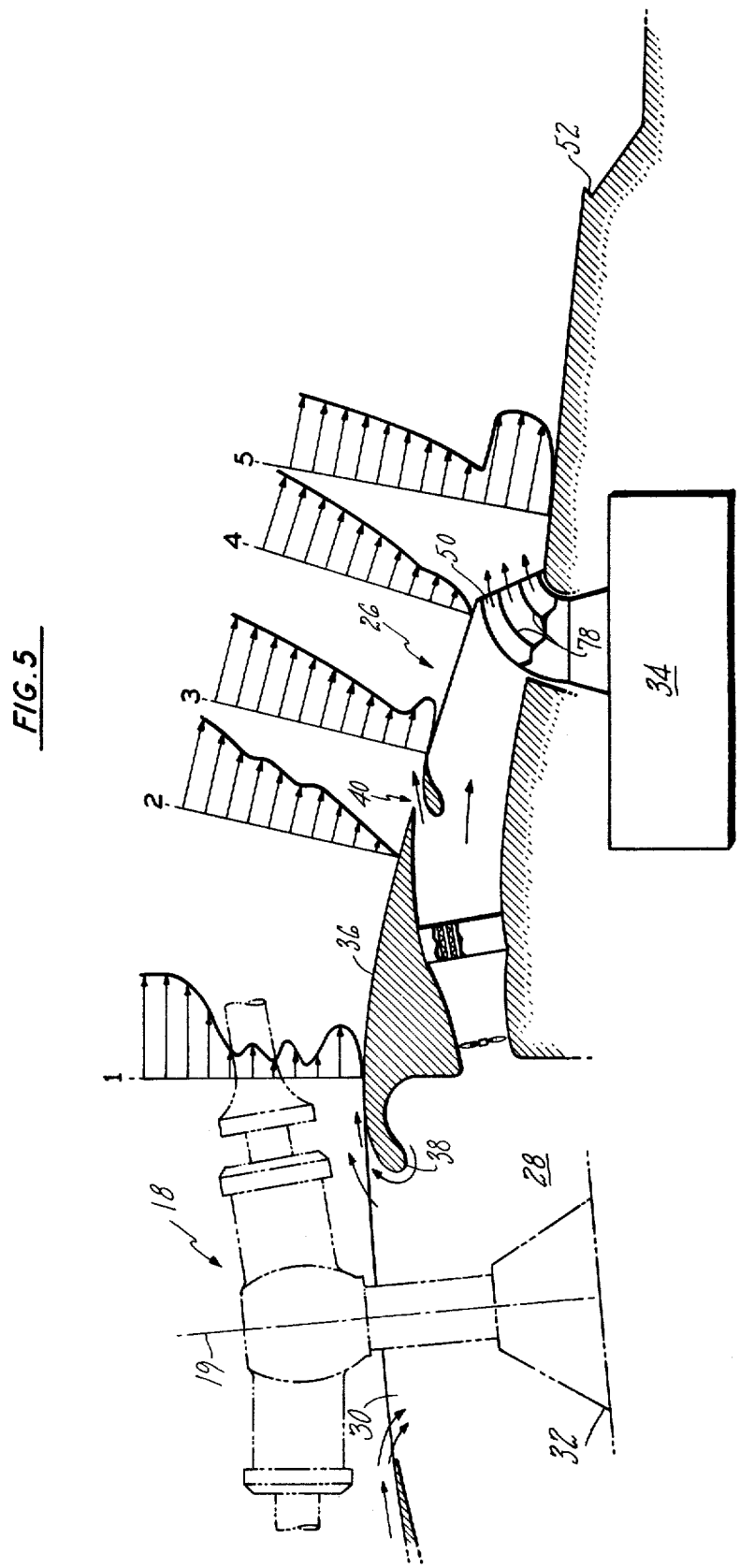

DRAG

BLC BLOWING POWER

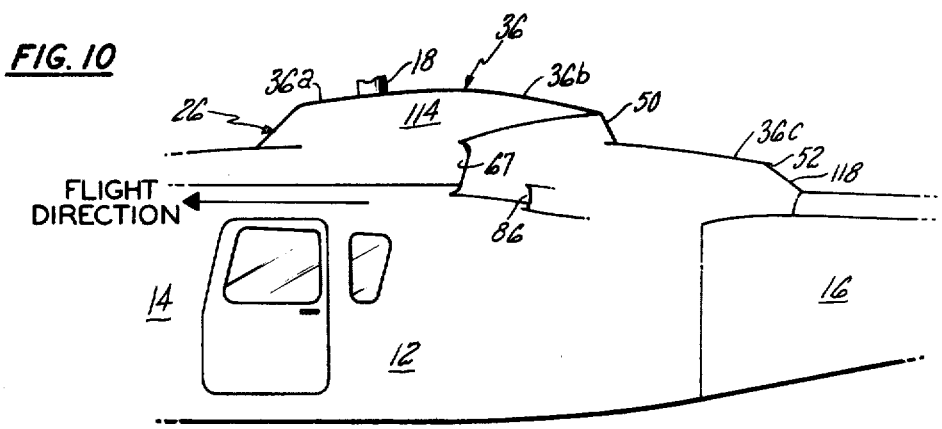
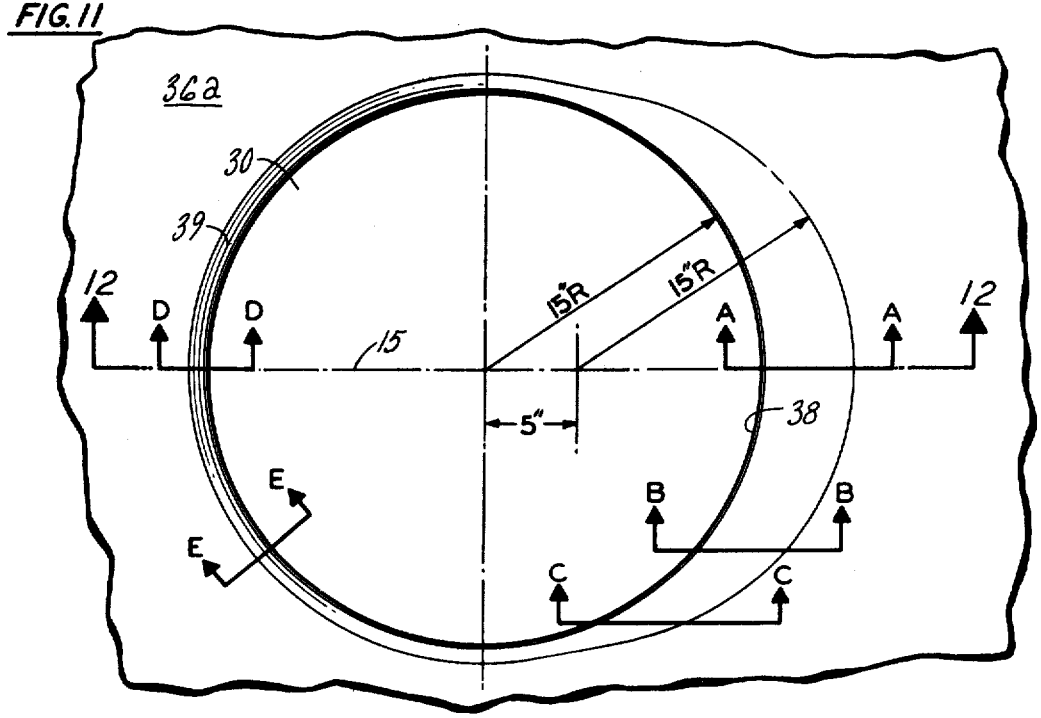
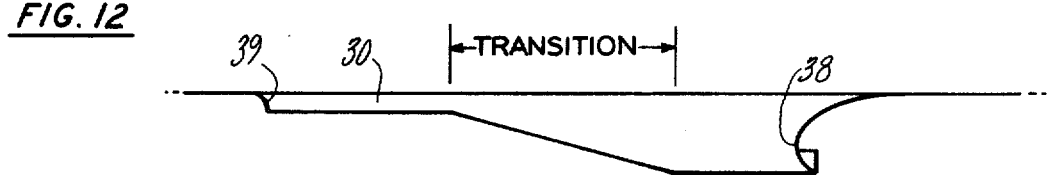

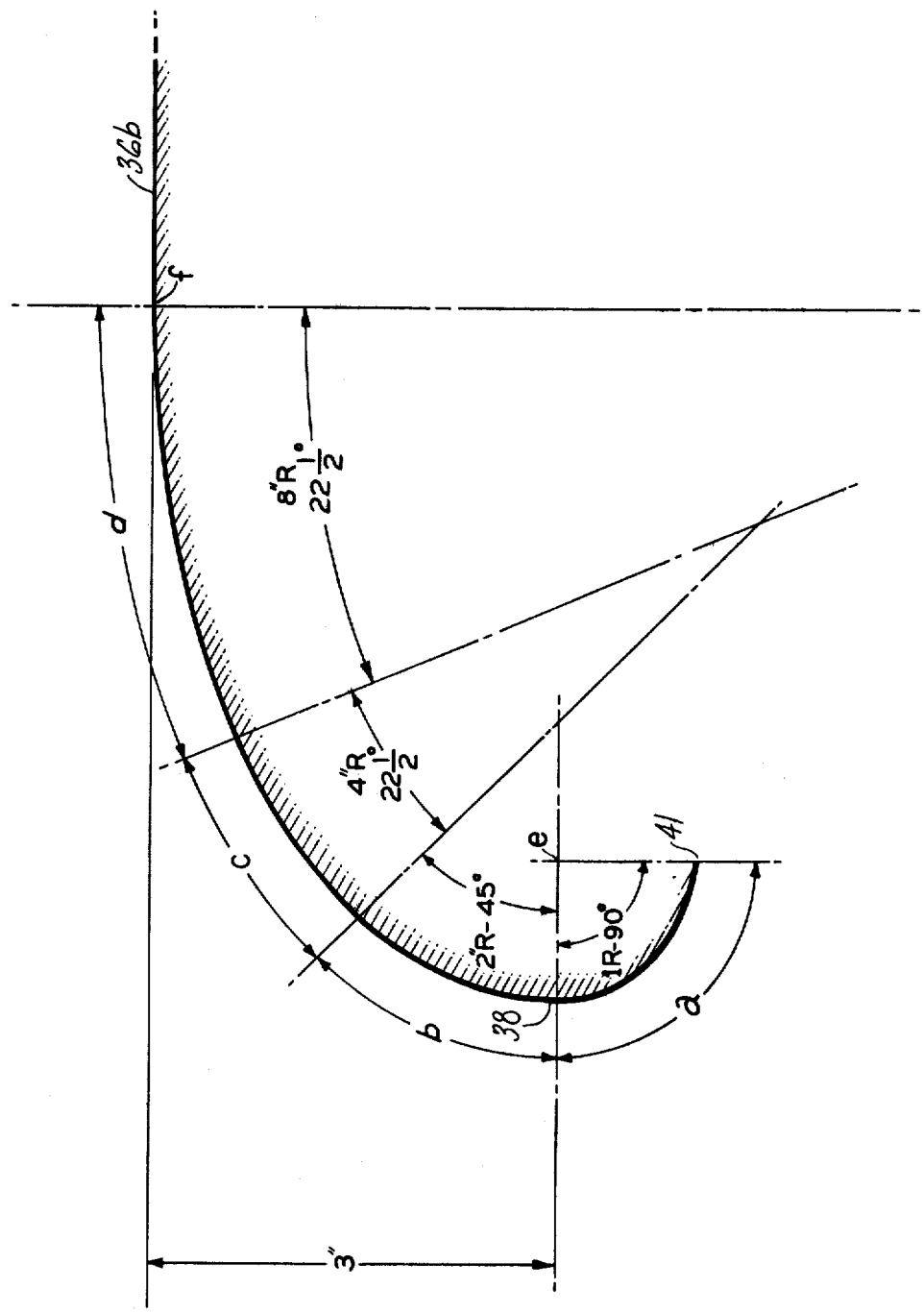

HELICOPTER

BACKGROUND OF THE INVENTION

1. Field of Invention

This invention relates to an improved helicopter in which the main rotor pylon and associated fuselage parts are designed to minimize external aerodynamic drag, ram drag penalties, turbulence, tail shake and exhaust gas reingestion problems in the engine.

2. Description of the Prior Art

In the helicopter art for twin engine designs, it is conventional to discharge engine exhaust laterally on opposite sides of the helicopter, thereby creating drag, and to fabricate the helicopter pylon of an aerodynamic shape so that flow separation would occur therealong during flight to produce additional drag, as in U.S. Pat. No. Des. 239,930 granted May 18, 1976 to H. D. Ulisnik and entitled "Helicopter". Similar lateral engine exhaust discharge and curved pylon surface construction is also shown in U.S. Pat. No. Des. 186,796 granted Dec. 1, 1959 to Gluhareff et al and entitled "Helicopter".

In the usual prior art helicopter construction, engine exhaust gases are discharged at relatively low velocities at an angle to each side of the helicopter, typically on the order of 45°, at the rear of the engine compartment pylon. This construction has the disadvantage that ram drag (air mass flow times flight velocity) that always occurs at an air inlet would not be counteracted by exhaust momentum, partly because of the low velocity and partly because of the cosine effect of the exhaust angle. There would thus be a net momentum deficiency, of the airflow through the engines which would add to the aircraft external aerodynamic parasite drag. The second disadvantage of this prior art construction is that the exhaust flow would trigger flow separation over the rear of the pylon behind the exhaust, adding to the external drag. The third disadvantage of this prior art construction is that the flow in the area behind the exhaust would typically by turbulent, leading to possible tail shake difficulties in certain flight regimes. The fourth disadvantage was that the exhaust might tend to recirculate under some flight conditions in and around hover, causing an engine temperature rise with consequent loss of engine power.

The prior art also utilized selectively shaped pylons to abate flow separation but these selective shapes add to manufacturing cost. Such a construction is shown in U.S. Pat. No. 3,008,671 granted Nov. 14, 1961 to Schneiter and entitled "Main Rotor and Pylon Fairing".

SUMMARY OF THE INVENTION

A primary object of the present invention is to provide an improved helicopter in which boundary layer flow along the fuselage is selectively energized to prevent flow separation and its attendant drag, turbulence and engine exhaust reingestion problems.

In accordance with the present invention, the top surface of the main rotor pylon is fabricated so that it defines a rotor head well aperture having a selectively curved lip on the rearward side thereof, so that much of the top surface extends approximately in the free stream direction, that is the opposite direction to helicopter flight, so that a boundary layer control slot is positioned a selected distance downstream of the curved lip to energize the boundary layer at that station, so that the engine and oil cooler exhausts are discharged in a downstream direction and at approximately cruise flight speed through one or more ports extending laterally across the pylon to energize flow, and in which the pylon top surface terminates in an overhung sharp lip to induce flow separation at that point to separate the exhaust flow from the airflow along the side of the aircraft and to delay engine exhaust gas impingement against the helicopter tail section.

It is a further object of this invention to teach such a helicopter in which the engine and transmission oil coolers are positioned in ducts through which air is pumped so as to pass thereover in heat exchange fashion before discharge through a boundary layer control slot and through an exhaust port in lateral alignment with the engine exhaust ports and position therebetween.

It is a further object of this invention to teach such an improved helicopter in which there are three boundary layer control stations on the main rotor pylon top surface, namely, the curved lip on the rotor well aperture rearward side, the boundary layer control slot downstream thereof, and the exhaust ports downstream thereof, all cooperating with the overhanging lip at the rearward end of the pylon top surface.

It is still a further object of this invention to teach such an improved helicopter in which the engine and oil cooler exhaust gases are discharged at approximately high-cruise-flight speed and therefore at sufficient velocity so as not to be diverted by the main rotor downwash and impinge the helicopter fuselage until the exhaust gases have been cooled substantially, and further so that the exhaust gas momentum carries the flow well outside the bubble of recirculation air that forms under the center of the rotor when hovering in ground effect, thus eliminating exhaust gas reingestion into the engines.

It is still a further object of this invention to teach an improved helicopter in which air can be provided to the engine inlet plenium through optimized reduced area inlet ducts, and further in which engine compartment cooling is provided.

Other objects and advantages of the present invention may be seen by referring to the following description and claims read in conjunction with the accompanying drawings.

BRIEF DESCRIPTION OF THE DRAWINGS

FIG. 5 is a showing of a helicopter main rotor pylon to illustrate the beneficial effects of my invention on boundary layer control of the air flowing thereover.

FIG. 10 is a side elevation showing of the S-76 helicopter illustrating my invention in this helicopter embodiment.

FIG. 11 is a showing of the top surface of the main rotor pylon illustrating the main rotor well aperture and its selectively curved rear lip.

FIG. 12 is a view taken along lines 12—12 of FIG. 11.

FIG. 13 is a view taken along any of lines A—A, B—B or C—C, or other sections parallel thereto of FIG. 11.

DESCRIPTION OF THE PREFERRED EMBODIMENT

Figure 1:
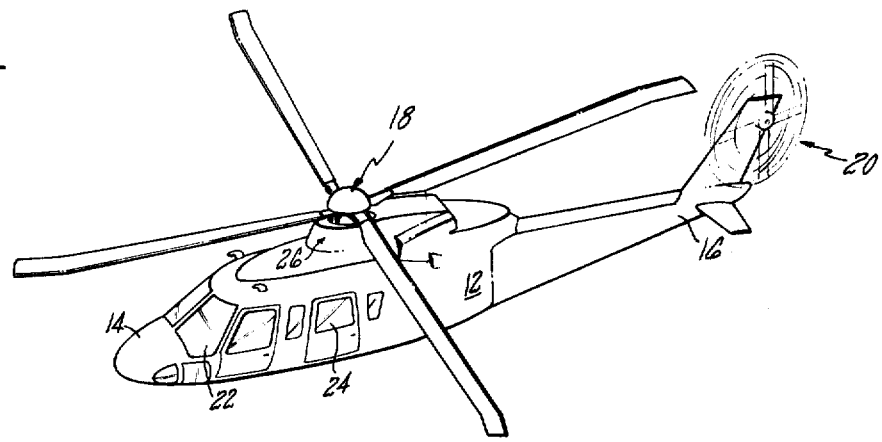
FIG. 1 is a perspective showing of the Sikorsky Aircraft S-76 helicopter utilizing my invention.

Referring to FIG. 1, we see the S-76 helicopter 10 which includes fuselage 12 having a nose section 14, a tail section 16, main lift rotor 18, and tail rotor 20. Fuselage 12 includes pilot compartment 22, passenger compartment 24, and main rotor pylon 26. Helicopter 10 has longitudinal dimension extending between nose 14 and tail 16, lateral dimension extending between the ship's port and starboard sides, and vertical dimension extending between the top of the lift rotor and the bottom of the fuselage. The S-76 helicopter has gas turbine engines which exhaust to atmosphere and which, in conventional fashion and as described hereinafter, drive the main rotor through a main rotor transmission and also drive the tail rotor.

In the helicopter art, it is very important that the drag created by the flight of the ship through the air be minimized. Much of this parasite drag occurs in the vicinity of the main rotor pylon 26, which is under the influence of the main rotor 18 downwash. In prior art helicopters, for example those shown in U.S. Pat. No. Des. 239,930 described supra, the rotor well aperture was sharp lipped and the gas turbine exhaust gases were discharged laterally on opposite sides of the rotor pylon, or elsewhere on the fuselage, at an angle of about 45°. I have found that these practices create undesirable drag and have designed the main rotor pylon portion of the S-76 helicopter to overcome the disadvantages of the prior art. To best understand the teachings of my invention, it is deemed desirable to explain the disadvantages of the prior art.

Figure 2:
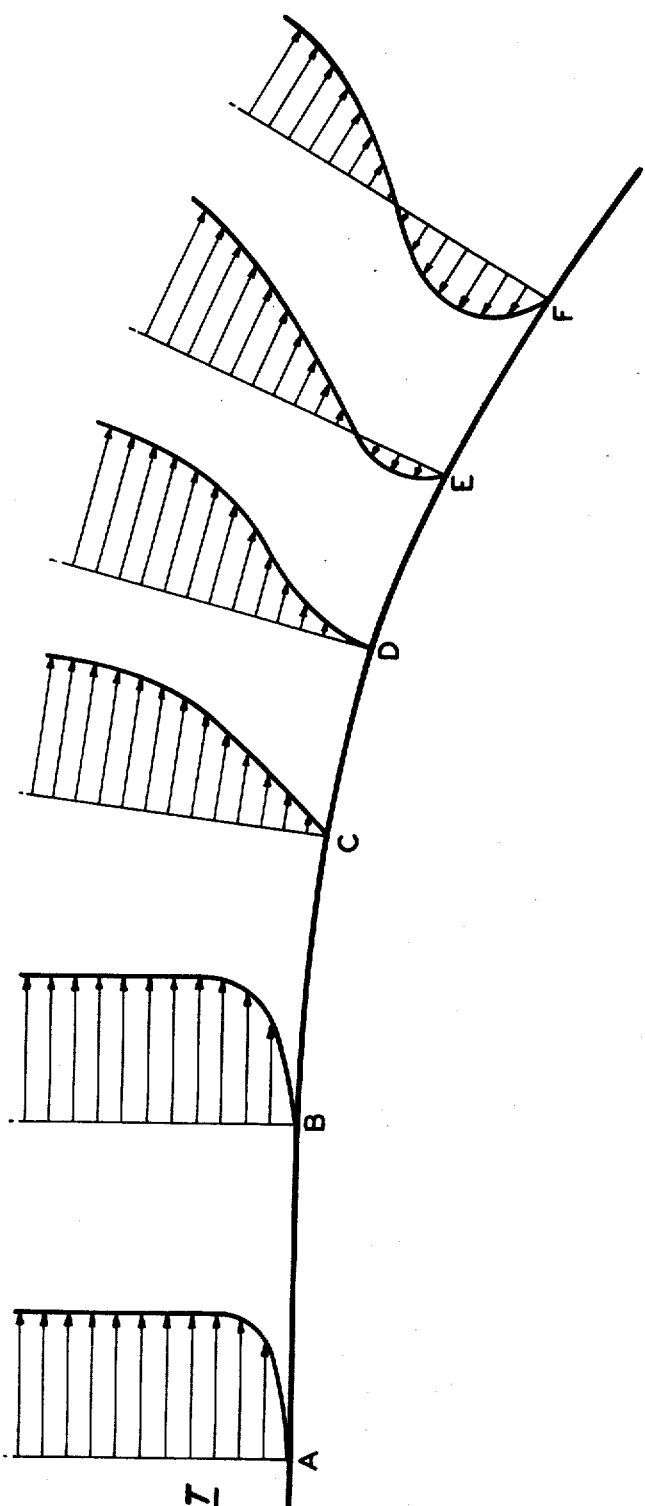
FIG. 2 is a showing of a prior art main rotor pylon top surface illustrating boundary layer flow deficiencies therein.

FIG. 2 shows in schematic form the prior art construction of the top surface or portion of a main rotor pylon as it is shaped downstream of the main rotor shaft. This prior art construction, as shown, is not sufficiently streamlined to avoid flow separation and the resulting pressure drag even neglecting the adverse influence of rotor head drag. Velocity profiles along the line perpendicular to the surface are shown from stations A through F along the surface. Station A is typical of the flow velocities in a region where the surface is essentially straight and parallel to the freestream or flight direction, assuming no loss in velocity due to a rotor head located upstream. The flow velocities at some distance from the surface are essentially constant and equal to the freestream velocity. At stations close to the surface, the boundary layer effect is evident and the velocity decreases to zero right at the surface because of the fluid viscosity. Boundary layer thickness is the distance from the surface to the point where the velocity is essentially constant with further increases in distance.

Station B represents a point farther downstream relative to station A, but with the surface still essentially flat and parallel to the freestream or flight direction. The velocity distribution is qualitatively similar to that at station A but the thickness of the boundary layer has increased because of the continuing viscous drag effects.

Figure 3:
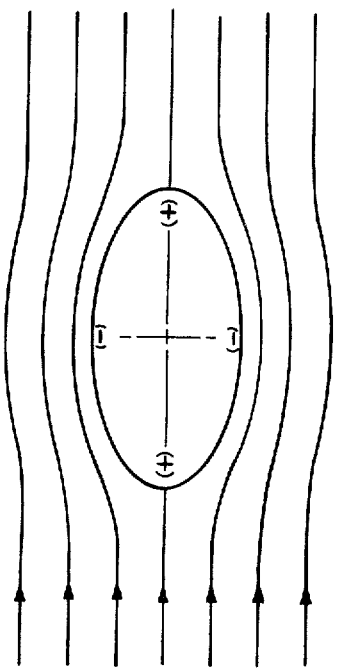
FIG. 3 is a showing of the flow of an ideal fluid around an obstacle.

Station C represents a point further downstream in an area where the surface curves away to some extent from the freestream or flight direction. At station C a new factor enters in to change the shape of the flow velocity profile. Whenever the surface curves, there will be a change in pressure along the surface, and in the case shown the pressure gradient is "adverse", that is, the surface pressure at C is greater than at B, and this pressure gradient will slow the velocity of air close to the surface. This pressure gradient is illustrated in FIG. 3, which shows a theoretical ideal flow around an elliptically shaped body. At the nose of this body the flow reaches a stagnation point and the surface pressure is positive relative to the ambient fluid pressure. Around the sides of the body the flow accelerates and the surface pressure generally becomes negative (less than the ambient fluid pressure) at or near the maximum thickness point of the body. In ideal, incompressible flow where fluid viscosity is nonexistent, the flow over the symmetrical body shown in FIG. 3 is also symmetrical, that is, the downstream portion of the flow field is a mirror image of the upstream portion of the flow field, and a rear stagnation point exists where the surface pressure is again positive. It is evident by viewing FIG. 3 that between the maximum thickness point of the body and the after end of the body there is an "adverse" pressure gradient, i.e., the pressure increases in the direction of the flow along the surface. This increase in pressure results in the velocity at the surface decreasing from a relatively high value at the maximum thickness point of the body to zero at the rear stagnation point.

Referring back to FIG. 2, the adverse pressure gradient between stations B and C results in a slowing of the air near the surface to a much greater extent than would result from the normal boundary layer thickness growth in a region of constant pressure. The velocity profile at station C is significantly different than the velocity profile at stations A and B. Still farther downstream at station D, the continuing adverse pressure gradient has slowed the air near the surface to the extent that not only the velocity at the surface is equal to zero but the velocity a short distance away from the surface is also zero. Still farther downstream at stations E and F, the continuing adverse pressure gradient results in a reversal of the flow near the surface, that is, the air is flowing upstream against the general flow field. This type of condition is referred to as a separated flow field, the point on the surface at station D being the point of separation. The flow in the separated region is usually turbulent or oscillatory and a relatively high drag results.

Figure 4:
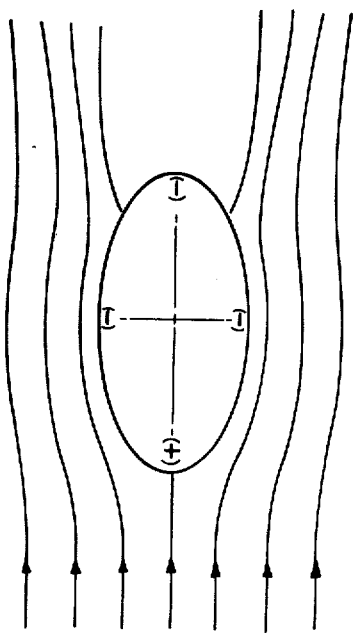
FIG. 4 is a showing of the flow of an actual fluid around an obstacle.

The reason for this high drag can best be seen by viewing FIG. 4 which shows a typical flow field around the FIG. 3 body but with a real fluid having a small but nonzero viscosity. The viscosity causes the boundary layer to develop so that the flow velocity near the surface is less than it would be otherwise. Over the front half of the body of FIG. 4 the pressure gradient is favorable, that is, the surface pressure decreases in the direction of flow, tending to accelerate the fluid and to overcome the slowing effect to viscosity. As a result, the streamlines and body surface pressure distribution over the front half of the body in FIG. 4 is essentially the same as for the ideal case in FIG. 3. However, the flow over the rear half of the body in FIG. 4 is altered considerably by viscosity. Because of the reduced velocity near the surface, the flow near the surface no longer has the momentum to carry to the rear stagnation point of FIG. 3. Instead, the flow separates in the manner already described, and the rear stagnation point of FIG. 3 never develops. The considerably altered flow field usually results in a slight negative pressure at the aft point of the body, although not as negative as at the maximum thickness point of the body. In the ideal case of FIG. 3 the positive pressure at the nose is balanced by an equal positive pressure on the after portion, and the drag of the body is zero. In the real fluid FIG. 4 case, however, the positive pressure on the nose is not balanced, and a large pressure drag force develops in addition to the drag which occurs directly as a result of viscous shear force between the fluid and the body. A more detailed description of this phenomenon can be found in the work entitled "Fluid Dynamic Drag" by Dr. Sighard F. Hoerner, published by Hoerner Fluid Dynamics, Post Office Box 32, Brick Town, N.J., 06723, 1965.

To overcome this flow separation and drag problem in the S-76 helicopter, I have designed the main rotor pylon so that boundary layer control devices exist at three stations therealong and cooperate one with the other as described hereinafter to prevent flow separation and its attendant drag until the air passing over the pylon is discharged rearwardly thereform. The benefits gained by my construction is illustrated in FIG. 5, which is the schematic representation of the main rotor pylon 26 of the S-76 helicopter. FIG. 5 shows the main rotor 18 extending from rotor head well 28 through rotor head well aperture 30 to a station exterior of the fuselage, where the rotor operates to generate lift in performing its normal helicopter function. Rotor 18 is supported from and driven by main rotor transmission 32, which is fixedly positioned in rotor head well 28, and is in turn driven by one or more gas turbine engines 34 by conventional drive train connections (not shown) therebetween.

The aerodynamic functioning of the S-76 main rotor pylon rear portion is illustrated in FIG. 5. In the region behind the rotor head 18, the flow velocities are relatively low and turbulent because of the relative high drag of the rotor, the push rods and the blade root ends. Station 1 shows a typical flow velocity distribution profile about a line normal to the main rotor pylon top surface 36 at a station close behind the rotor head 18. Close to the pylon top surface 36, the flow velocities are assisted by the design of the rear edge 38 of the rotor head well aperture 30. Because of the main rotor pylon geometry, rotor downwash effects, and fuselage or body trim attitude in forward flight, a substantial amount of air enters the rotor head well 28 from the front. Most of this air must then exhaust from well 28 in some manner. Typically, in past helicopter designs, the rear lip of the well aperture was sharp with the result that a local flow separation occurred and very little streamwise momentum remained in the air flow being discharged from the rotor head well 28. In the present design, the rear lip 38 of rotor head well is selectively curved or rounded, with an airfoil-type cross section of gradually changing radius-of-curvature, so that the outflow is turned around to a substantially downstream direction, that is in the free stream direction or flight direction, thereby minimizing the momentum loss and reducing drag. The increase in velocity close to the pylon surface 36 as illustrated at station 1 of FIG. 5, relative to typical past practice, is important in achieving low drag over the entire main rotor pylon area.

For a more complete understanding of the shape of rotor head well aperture 30, and more particularly rear edge lip 38 thereof, reference will now be made to FIGS. 11-13. By referring to FIG. 11 it will be noted that in my particular embodiment the rotor head well aperture 30 is of approximately 15 inch radius, and the top and farthest rearward surface of selectively curved lip 38 is defined by an arc of similar curvature struck from a point about 5 inches rearward of that of aperture 30 along aperture and aircraft longitudinal axis 15. As best shown in FIGS. 11 and 12, the forward edge 39 of aperture 30 is of 1 inch radius and extends for approximately 180° around the periphery of the rotor head well aperture 30, sections D—D and E—E being identical as shown in FIG. 12. The rearward lip 38, is selectively shaped so as to be of a selected identical airfoil shape at stations A—A,, B—B and C—C, and all other stations parallel to the direction of flight on axis 15. Curved lip 38 also extends substantially to 180° of the periphery of aperture 30 and is centered on axis 15, allowing for the transition section shown between the forward lip 39 and the rearward lip 38.

The curvature of lip 38 at any of stations A—A, B—B or C—C, is illustrated in FIG. 13. The actual curve of lip 38 is of continuously changing radius of curvature, but may be approximated by the dimensions shown in FIG. 13. It will be noted by viewing FIG. 13 that the inboard portion a of lip 38 is of maximum curvature and is formed by striking an arc of about 90° and of 1 inch radius some 3 inches inwardly from surface 36b. Outboard of portion a, there is a second portion b formed by striking an arc of about 45° at a radius of about 2 inches. Further outboard of portion b is a third portion c formed by striking an arc of about 22½° at a radius of about 4 inches, and finally section d defined by an arc of about 22½° at a radius of about 8 inches. These four separate curvatures a-d are smoothly joined to each other and smoothly join the inboard point 41 of rearward lip 38 to main rotor pylon surface 36b and this selective shape causes the gases which are discharged from the rotor head well 28 to follow this selectively shaped lip and be discharged along pylon surface 36b without experiencing flow separation.

It will be noted by observing the dimension shown in FIG. 13 that the radius of curvature along portion a of lip 38 is approximately 3 percent of the well aperture 30 diameter, that portion a curvature is struck about a point e which is approximately 10 percent of the well aperture diameter below surface 36b, and that lip 38 extends rearwardly and joins surface 36b at point f at a longitudinal distance of approximately 5 inches of 17 percent rearward of the well aperture minimum diameter. It will therefore be seen that lip 38 is of sharpest curvature at its inboard end and gradually decreases in curvature until it smoothly joins and blends into pylon top surface 36b. My co-pending U.S. Patent Application Ser. No. 904,956 filed July 12, 1978 shows a generally curved lip at the mouth of the rotor head well, but it is of no specific curvature.

Again, viewing FIG. 5, we see the flow velocity distribution at a location farther downstream at station 2. Two effects can be seen in the region behind the rotor head, the first of which is that the flow velocities have increased and become steadier because of the diffusion of the higher energy air from the top and sides into the low energy wake behind the rotor head. The second effect is that velocities close to the pylon top surface 36 have decreased, partly because of viscous effects and partly because of the adverse pressure gradient that occurs, as previously described in connection with FIG. 2 on the curved afterportion of a body. It is evident by viewing FIG. 5 that to avoid premature separation of flow from pylon top surface 36, it is important to have as large an initial velocity close to surface 36 as possible. The selectively curved lip 38 forward of station 1, therefore, helps to prevent separation from occuring as far back as station 2. As shown, the velocity profile is attached to surface 36 at station 2 but is such that the continuing adverse pressure gradient will cause flow separation a short distance downstream unless the boundary layer is reenergized.

Accordingly, at a selected distance downstream of curved lip 38, which distance is determined by the aerodynamic characteristics of the main rotor pylon of the particular helicopter in flight, a boundary layer control 40 is introduced to reenergize surface flow and thereby avoid flow separation. Boundary layer control 40 is a boundary layer control slot extending laterally across substantially all of pylon top surface 36 and formed as a convergent nozzle shaped so that fluid flow passing therethrough serves to energize the boundary layer. In my construction, airflow which is used to cool engine and transmission oil coolers in the S-76 helicopter is ducted in such a way that a substantial portion of this airflow exhausts through lateral boundary layer slot 40 on the pylon top surface 36. Slot 40 forms a converging nozzle which accelerates the flow and exhausts it substantially parallel to surface 36 in a downstream direction. It should be noticed that surface 36 extends substantially in the direction of flight, that is the free stream direction, and that this is the direction of discharge of fluid from boundary layer slot 40. This boundary layer slot flow energizes the boundary layer close to the surface 36 of the pylon as shown in the velocity profile at station 3. This velocity profile is effective in resisting separation in the continuing adverse pressure gradient to the rear of this portion of main rotor pylon 26, as shown at station 4. It should be noted that at station 4, the velocity of the boundary layer near the surface is again very low and that flow separation is likely to occur a short distance downstream thereof.

To prevent this flow separation downstream of station 4, the engine exhaust and the remainder of the oil cooler exhaust is discharged through appropriate ducting, preferably with turning vanes, so that it is discharged through exhaust port 50 in a downstream direction substantially parallel to the flight direction and serves to prevent flow separation. Since the exhaust velocity is high and the volume of flow is substantial, the exhaust fluid, as best shown at station 5 of FIG. 5, act as a powerful boundary layer energizer. If the exhaust fluids were not introduced in this manner, but rather directed at low velocity laterally to the side, as in most previous helicopter designs such as is shown in U.S. Pat. No. D239,930, then the rotor pylon would have to be curved downwardly from station 4 and flow separation and increasing drag would result, becuase of the continuing adverse pressure gradient, unless more power were put into the oil cooling blower system and the boundary layer control exhaust jets increased in energy.

Because the two gas turbine engines of the S-76 are separated laterally, as are their exhaust ducts, a portion of the oil cooler air is brought back in a duct between the two engine exhaust ducts and is exhausted in a parallel direction to the engine exhaust. This discharge of the oil cooler air between the two engine exhausts avoids having a solid surface between the engine exhausts which would cause a parasite drag because of the negative pressures that would develop.

Figure 6:
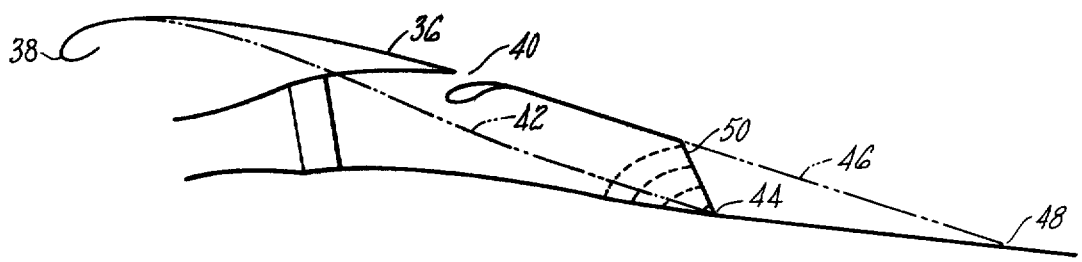
FIG. 6 is a representation of a portion of the FIG. 5 embodiment illustrating alternative constructions to my proposed construction.

This is best illustrated by viewing FIG. 6 which shows that if the exhaust from the oil coolers were not discharged through a port positioned between the two laterally separated engine exhaust ports, the main rotor pylon would have to be fabricated so as to present solid surface 42 located between the engine exhaust ducts and terminating at station 44 adjacent the engine exhaust ducts, or alternately surface 46 which extends substantially downstream thereof, terminating at station 48, or in some other similar fashion. Each of the alternate constructions indicated has disadvantages over the construction taught herein in that if surface 42 were selected, due to the high angle involved flow separation would be encountered, thereby producing a high drag situation. If lower angled surface 46 were selected, such would obviously add to the total weight of the aircraft, would present a substantially larger surface which would be exposed to the high temperature, high velocity engine exhaust gases, and would produce more skin friction drag.

In addition to the reduction of drag due to flow separation just described, another advantage of discharging the oil cooler air between the laterally separated engine exhaust gas ducts, is that all such discharge is in a downstream direction approximately parallel to flight direction with the flow velocity approximately equal to the cruise flight speed, to thereby avoid a substantial momentum drag penalty (equal to the engine mass flow times the flight velocity), that would occur if the exhaust was substantially lateral and at very low velocity as in the prior art. The velocity of the engine exhaust gas and the oil cooler cooling air is brought to approximately cruise flight speed by a selection of area sizes to be discussed hereinafter.

At the termination of the main rotor pylon top surface 36, as can be shown in FIG. 5, the pylon is shaped to define a sharp edge or lip 52 to induce flow separation at that point and thereby prevent the engine exhaust gases from impinging against the helicopter tail portion until they have cooled substantially due to intermixing with atmospheric air.

It will, therefore, be seen that there are three stations along main rotor pylon 26 where boundary layer control mechanisms operate and coact. First, curved lip 38 on the rearward side of rotor head well aperture 30, lateral boundary layer slot 40, exhaust ports 50, all of which serve to prevent or abate flow separation, and sharp lip member 52, which serves to establish flow departure in the same manner that the trailing edge of a helicopter or turbine blade does to prevent motion of the fluid following therearound.

Figure 7:
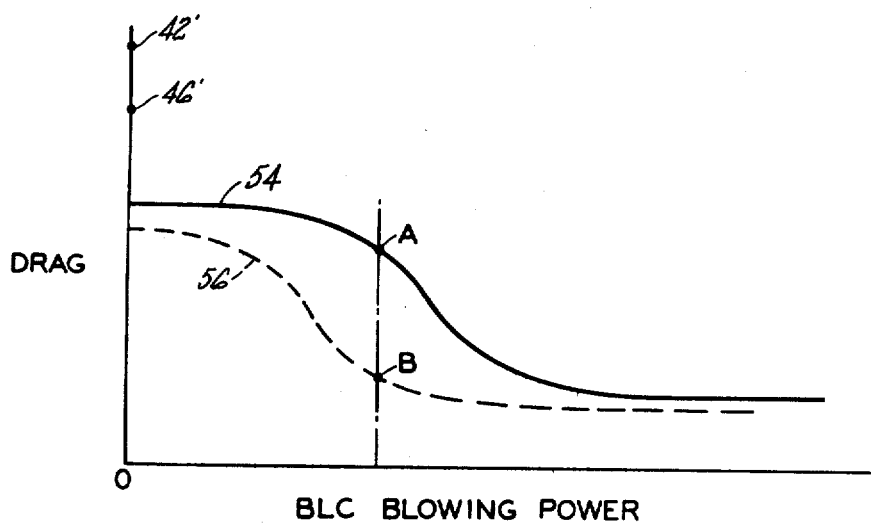
FIG. 7 is a graph of drag plotted against BLC blowing power to demonstrate the cooperative action or synergistic results achieved by the utilization of my curved rotor head well aperture, boundary layer control slot, and exhaust port arrangements

To demonstrate the cooperative action and synergistic results achieved by the utilization of curved rotor head well aperture 38, boundary layer control lateral slot 40, and exhaust gas ports 50, attention will now be directed to FIG. 7. FIG. 7 is a plot based upon qualitative analysis and prior test experience of drag encountered plotted against boundary layer control blowing power. Curve 54 represents aerodynamic operation utilizing the normally sharp lip in the rotor head well in combination with the boundary layer control slot 40, while curve 56 shows the aerodynamic operation utilizing the curved lip 38 taught herein with boundary layer control slot 40. By viewing the FIG. 7 curve, it will be noted that at the condition of design oil cooler flow, curve 54 demonstrates drag at point A, while point B represents the drag encountered with the curve 56 configuration. The drag reduction due to the curved lip 38 is the difference between drag at point A and drag at point B. Further, if instead of placing the two laterally spaced engine exhaust ducts in lateral alignment with the oil cooler duct therebetween, we utilized the surfaces 42 or 46 of FIG. 6 as a substitute for the centered oil cooler duct, we could expect our FIG. 7 drag to commence at point 42' for the surface 42 construction and at point 46' for the surface 46 construction.

Figure 9:
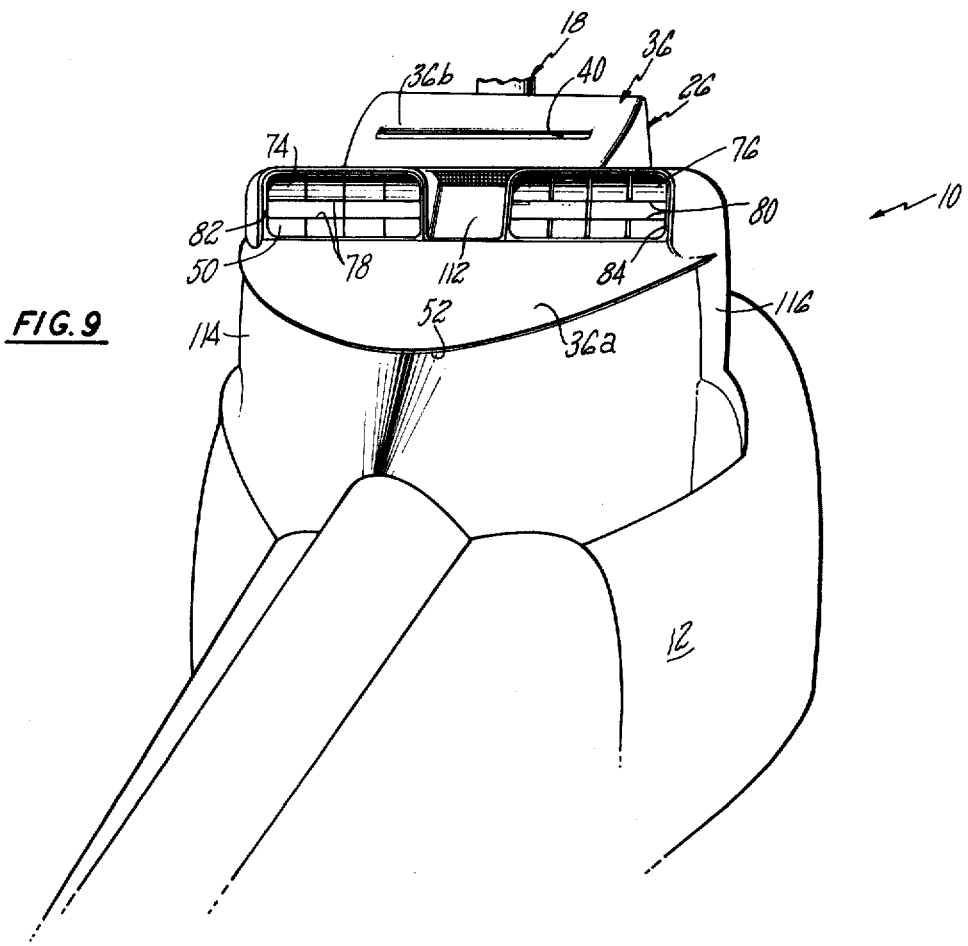
FIG. 9 is a perspective showing of the main rotor pylon portion of the S-76 helicopter, rear view, showing a portion of my invention.
Figure 8:
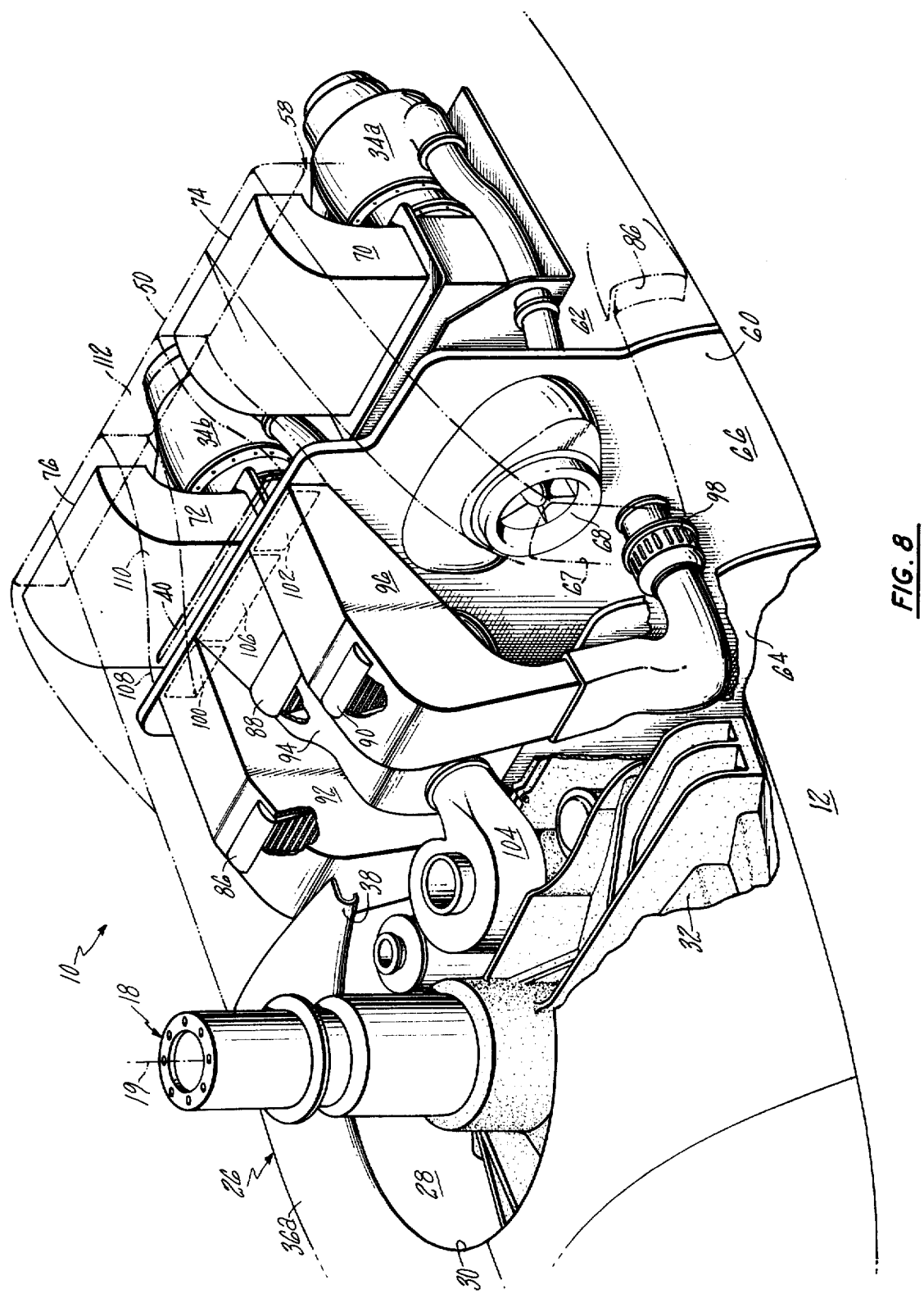
FIG. 8 is a perspective showing of the S-76 main rotor pylon section, partially broken away, to illustrate the boundary layer energization fluid sources located therein.

A practical embodiment of my invention is shown in FIG. 8 in which compartments 58 and 60 extend laterally across pylon 26 and a portion of the remainder of fuselage 12 to define engine compartment 62 therebetween. A longitudinal partition (not shown) separates engine compartments 62 into individual compartments for gas turbine engines 34a and 34b. Engine 34a is positioned and extends longitudinally on the port side of helicopter 10, while gas turbine engine 34b is positioned and extends longitudinally on the starboard side of helicopter 10. Similarly, partitions 60 and 64 cooperate to define engine inlet plenum 66 therebetween. Air enters plenum 66 through ram scoops 67 located on opposite sides of pylon 26. A longitudinally extending central partition (not shown) divides engine plenum 66 into individual plenums for each engine inlet, the engine inlet for gas turbine engine 34a being shown at 68. The engine inlet for engine 34b is identical therewith but hidden behind ducting in the FIG. 8 configuration. Partition 64 cooperates with main rotor pylon 26 and other portions of fuselage 12 to define rotor head well 28, in which transmission 32 is fixedly positioned. As described in connection with FIG. 5, rotor well aperture 30 has selectively curved lip 38 at the rearward side thereof. In conventional fashion, gas turbine engines 34 operate through drive trains to drive transmission 32, which in turn drives main rotor 18 about its axis of rotation 19. Ducts 70 and 72 conduct the exhaust gases from engines 34a and 34b, respectively, so as to discharge them in a rearward direction through their respective outlet 74 and 76, which are positioned at the lateral opposite sides of exhaust port 50. The exhaust gases are caused to flow in the desired direction due to the shape of ducts 70 and 72 and the coaction of one or more turning vanes 78 and 80 therein. As best shown in FIG. 9, exhaust ports 74 and 76 are slightly smaller than and positioned within pylon defined exhaust port 50 so that gaps 82 and 84 extend at least a portion of the way therearound and preferably fully therearound so as to cooperate with air scoops, such as 86, and provide cooling air in engine compartments 62, which air enters through scoops 86 and is ejected therefrom in ejector fashion through apertures 82 and 84 so as to provide cooling air for engines 34a and 34b.

Each engine and the transmission 32 has an oil cooler 86, 90 and 88, respectively, positioned in ducts 92, 96 and 94, respectively, in the engine inlet plenum 66. Engine oil cooler ducts 92 and 96 have cooling air passed therethrough from engine inlet plenum 66 due to the action of a fan or fluid pump member 98 at the entrance to each duct 92 and 96. In passing through ducts 92 and 96, this cooling air passes through the oil carrying cores of oil heat exchangers 86 and 90 so as to cool the engine lubricating oil. Ducts 92 and 96 end in apertures 100 and 102. Duct 94 is positioned between ducts 92 and 96 and has air pumped therethrough by pump member 104 positioned in well 28. Pump 104 is preferably transmission driven. The fluid from pump 104 passes through duct 94 and through transmission oil cooler 88 in heat exchanger fashion. Duct 94 terminates in outlet 106. The outlets 100, 106 and 102 of ducts 92, 94 and 96, respectively, discharge oil cooler cooling air into a common duct 110, where a selected portion thereof is discharged through laterally extending boundary layer control slot 40, which is shown in greater particularity in FIG. 5, and the remainder thereof is passed rearwardly through duct 110, which narrows perceptively in lateral dimension as duct 110 extends rearwardly and is discharged through oil cooler air outlet 112, which is positioned between and lies in substantially the same plane as engine exhaust gas outlets 74 and 76, is in lateral array therewith and cooperates therewith in defining lateral exhaust port 50. Outlets 74, 76 and 112 substantially fill exhaust port 50. It will therefore be noted that the engine exhaust from engines 34a and 34b, respectively, are discharged through exhaust ports 74 and 76, while the oil cooler cooling air, after passing over oil coolers 86, 88 and 90 are joined in duct 110, a portion thereof is discharged through boundary layer control slot 40 and the remainder thereof is discharged through oil cooler air discharge port 112, positioned between ports 74 and 76 to define laterally extending discharge ports 50.

Preferably BLC slot 40 is located in the top wall of duct 110. Cooling air discharge therefrom is aided by the fact that the entrance lip to the BLC slot forms a ram scoop in the internal flow (see FIG. 5), and also by the fact that the static pressure inside duct 110 at slot 40 is higher (because of the blowers) than on the external pylon surface.

The engine exhaust gas velocity is determined by the engine power condition and by the exhaust duct exit areas 74 and 76. The oil cooler exhaust velocity is determined by the oil cooler air mass flow (determined by the blower designs) and the combined exit areas of BLC slot 40 and exit area 112 of duct 110. If desired, the areas of 40, 74, 76 and/or 112 may be defined by fixed convergent nozzles, or variable area nozzles.

For a better understanding of the external construction of my improved helicopter, attention is now directed to FIGS. 9 and 10. We see that main rotor pylon 26 extends vertically above the remainder of fuselage 12 and is positioned longitudinally between nose 14 and tail 16. The top surface 36 of pylon 26 includes forward portion 36a which forms the top of rotor head well 28 and has rotor head well aperture 30, with its selectively curved lip 38, therein. Forward portion 36a blends smoothly with top surface central portion 36b. Surface 36b is curved slightly away from the flight direction. Surface 36c extends approximately in the flight direction and is positioned vertically below surface 36b and exhaust port 50 extend therebetween. Boundary layer slot 40 is positioned in surface 36b. Pylon extension 118 smoothly joins the sharp trailing edge 52 of surface 36c to the tail section 16. Pylon 26 also includes smooth aerodynamic side surfaces 114 and 116 which join at their forward ends to form the forward portion of pylon 26, which diverge in a downstream direction to the station at which they define rotor head well 28, then further diverge at the engine air inlets, and then converge to join each other in forming pylon extension 118. It will, therefore, be seen that in view of this construction, the air which is discharged from rotor head well 28 is caused by the selective curvature of lip 38 to be discharged rearwardly along surface 36b, has energy added to the boundary layer thereof by boundary layer slot 40 as it travels thereover at surface 36b, has further energy added to the boundary layer thereof by the discharge of fluid through exhaust port 50, and then, after traveling along surface 36c is discharged over sharp lip 52 to separate the flow cleanly from pylon 26 to prevent the hot engine exhaust gases from impinging against tail 16 until the hot gases reach a station substantially downstream of lip 52, at which time the exhaust gases have been substantially cooled by atmospheric air, and may then be caused to impinge against tail section 16 by rotor downwash.

It would be evident to those skilled in the art that boundary layer control slot 40 and each of the ports 74, 76 and 112 which define exhaust port 50 could be made to be variable in area in conventional fashion if desired to control the exhaust discharge velocity.

I wish it to be understood that I do not desire to be limited to the exact details of construction shown and described, for obvious modifications will occur to a person skilled in the art.

I claim:

1. A helicopter having longitudinal, lateral and vertical dimension and operable to fly in conventional attitude to establish helicopter forward flight direction in cruise mode and comprising:
(A) a fuselage defining:
  (1) a nose section at its longitudinal forward end,
  (2) a tail section spaced longitudinally rearwardly of the nose section and,
  (3) a main rotor pylon positioned longitudinally between the nose section and tail section and extending vertically thereabove, said main rotor pylon being shaped to define a rotor head well therewithin at its longitudinally forward end, and including:
    (a) a top surface having:
      (1) a forward portion defining the top of the rotor head well,
      (2) a central portion smoothly connected to the forward portion,
      (3) a rear portion positioned vertically lower then the central portion and extending substantially in the direction of helicopter forward flight,
      (4) a rotor head well aperture extending through said top surface forward portion to place the rotor head well into communication with atmosphere, said aperture having a selectively curved lip along the rearward side thereof extending from said top surface into said rotor head well so that air being discharged from said rotor head well during forward flight will flow along the curved lip and be discharged rearwardly parallel to and along the top surface central portion,
      (5) a boundary layer control slot positioned in said top surface central portion a selected distance rearwardly of said rotor head well aperture curved lip and extending laterally along said top surface central portion and shaped to define a converging nozzle positioned to place the pylon interior into communication with atmosphere and so that fluid passing through said boundary layer control slot will be discharged therefrom rearwardly parallel to and along said top surface central portion
      (6) an exhaust port extending laterally along and vertically between said top surface central portion and said top surface rear portion and placing the pylon interior into communication with atmosphere and shaped to discharge fluid from the pylon interior rearwardly therethrough parallel to and along said top surface rear portion,
      (7) a sharp lip defining the rear edge of said pylon top surface rear portion and shaped to separate the fluid passing along said top surface rear portion from the pylon surface when passing over said sharp lip,
      (8) a pylon extension extending vertically inwardly and rearwardly from said sharp lip to form an acute angle with the top surface rear portion and joining the top surface rear portion to said tail section,
      (9) pylon side surfaces selectively shaped to define smooth aerodynamic surfaces positioned on opposite sides of the pylon top surface and extending downwardly therefrom and being smoothly joined at their forward ends and diverging laterally outwardly in a rearward direction to parfially define the rotor head well and engine inlets and then converging laterally inwardly to smoothly join to the pylon extension
(B) a helicopter rotor extending from said rotor head well through said rotor head well aperture for operation at a station vertically above the fuselage,
(C) means to discharge fluid rearwardly through said boundary layer control slot along said pylon top surface central portion, and
(D) means to discharge fluid rearwardly through said exhaust port along said pylon top surface rear portion.

2. A helicopter according to claim 1 wherein said rotor head well aperture lip is selectively curved so that the lip curvature decreases in a rearward direction from the lip inner edge to its rearward station where it blends smoothly into the pylon top surface and wherein said boundary layer control slot is shaped to define a convergent nozzle extending for substantially the full lateral dimension of the pylon top surface central portion.

3. A helicopter according to claim 2 wherein said exhaust port fluid discharge means includes a fluid source and fluid ducting of selected cross-sectional area outlet to discharge fluid through the exhaust ports at substantially helicopter forward flight cruise speed.

4. A helicopter according to claim 3 and including two gas turbine engines fixedly positioned in said fuselage, a main rotor transmission positioned in said rotor head well and adapted to be driven by said engines and to drive said main rotor, a plurality of oil coolers positioned in said fuselage and operably connected to each of said engines and said transmission, first duct means connecting the exhaust of one of said engines to and forming a laterally outer portion of said exhaust port, second duct means connecting the exhaust of the other engine to and forming the other laterally outer portion of said exhaust port, third duct means enveloping one of said engine oil coolers, fourth duct means enveloping the other engine oil cooler and fifth duct means enveloping the transmission oil cooler, said third, fourth and fifth duct means terminating substantially adjacent said boundary layer control slot and providing fluid for discharge therethrough, sixth duct means constituting a rearward continuation of said third, fourth and fifth duct means and receiving all fluid therefrom which has not been discharged through said boundary layer control slot and terminating between said first and second duct means and constituting the central portion of said exhaust port.

5. A helicopter according to claim 4 and including compartment means within said fuselage defining an engine inlet plenum positioned rearwardly of the rotor head well and an engine compartment positioned rearwardly of the engine inlet plenum, and wherein said first and second duct means are located in said engine compartment, wherein said third, fourth and fifth duct means are located in said engine inlet plenum, wherein said fifth duct means is positioned between said third and fourth duct means, and means to pump fluid from said engine inlet plenum through said third and fourth duct means, and means to pump fluid from said rotor head well through said fifth duct means so that a portion of the fluid being pumped through said third, fourth and fifth duct means is discharged through said boundary layer slot and so that the remainder is discharged through the outlet of the sixth duct means.

6. A helicopter according to claim 5 and including means to provide ram air during flight to said engine inlet plenum, and means to cool said engine compartment.

7. A helicopter according to claim 6 wherein said engine compartment cooling means comprises a ram air inlet duct projecting from said fuselage and communicating with said engine compartment and an engine cooling air discharge port of selected cross-sectional area and operating as an ejector defined between the outlets of said first and second duct means and the exhaust port.

8. A helicopter according to claim 6 wherein said sixth duct means reduces in lateral dimension and cross-sectional area in a rearward direction so that the fluid being discharged therefrom is discharged substantially at helicopter forward flight cruise speed.

9. A helicopter according to claim 2 wherein said rotor head well aperture selectively curved lip extends approximately 180° around the aperture periphery and is centered on the helicopter longitudinal axis and wherein the curved lip is of the same cross-sectional shape at all sections taken therethrough parallel to the helicopter longitudinal axis, and which cross-sectional shape constitutes a first portion forming an approximately 90° arc of radius equal to approximately 3 percent of the aperture diameter struck about a point approximately 10 percent of the aperture diameter inboard of the pylon top surface central portion, then constituting a second portion defining an arc struck through approximately 45° about a radius equal to 7 percent the aperture diameter and constituting a smooth continuation of the first portion, then constituting a third portion defining approximately 22½° of arc struck about a radius of approximately 13 percent of the aperture diameter and constituting a smooth continuation of said second portion, and finally a fourth portion constituting an arc of approximately 22½° struck about a radius equal to about 27 percent of the aperture diameter and constituting a smooth continuation of said third portion and smoothly blending with the pylon top surface central portion at a station approximately 17 percent of the aperture diameter rearwardly of the aperture minimum diameter station.

10. A helicopter having longitudinal, lateral and vertical dimension and operable to fly in conventional attitude to establish helicopter forward flight direction in cruise mode and comprising:
(A) a fuselage defining:
 (1) a nose section at its longitudinal forward end,
 (2) a tail section spaced longitudinally rearwardly of the nose section and,
 (3) a main rotor pylon positioned longitudinally between the nose section and tail section and extending vertically thereabove, said main rotor pylon being shaped to define a rotor head well therewithin at its longitudinally forward end, and including:
  (a) a top surface having:
   (1) a first portion defining the top of the rotor head well,
   (2) a second portion smoothly connected to the first portion and extending rearwardly therefrom,
   (3) a rotor head well aperture extending through said top surface first portion to place the rotor head well into communication with atmosphere, said aperture having a selectively curved lip along the rearward side thereof extending from said top surface into said rotor head well so that air being discharged from said rotor head well during forward flight will flow along the curved lip and be discharged rearwardly parallel to and along the top surface second portion,
   (4) a boundary layer control slot positioned in said top surface second portion a selected distance rearwardly of said rotor head well aperture curved lip and extending laterally along said top surface second portion and shaped to define a converging nozzle positioned to place the pylon interior into communication with atmosphere and so that fluid passing through said boundary layer control slot will be discharged therefrom rearwardly parallel to and along said top surface second portion to energize boundary layer flow therealong,
(B) a helicopter rotor extending from said rotor head well through said rotor head well aperture for operation at a station vertically above the fuselage,
(C) means to discharge fluid rearwardly through said boundary layer control slot substantially in the direction of the top surface second portion.

11. A helicopter according to claim 10 wherein said well aperture curved lip decreases in curvature from its inboard lip to its point of termination in said top surface second portion.

12. A helicopter according to claim 10 wherein said rotor head well aperture selectively curved lip extends approximately 180° around the aperture periphery and is centered in the helicopter longitudinal axis and wherein the curved lip is of the same cross-sectional shape at all sections taken therethrough parallel to the helicopter longitudinal axis, and which cross-sectional shape constitutes a first portion forming an approximately 90° arc of radius equal to approximately 3 percent of the aperture diameter struck about a point approximately 10 percent of the aperture diameter inboard of the pylon top surface second portion, then constituting a second portion defining an arc struck through approximately 45° about a radius equal to about 7 percent of the aperture diameter and constituting a smooth continuation of the first portion, then defining a third portion approximately 22¼° of arc struck about a radius of approximately 13 percent of the aperture diameter and constituting a smooth continuation of said second portion, and finally a fourth portion constituting an arc of approximately 22¼° struck about a radius equal to about 27 percent of the aperture diameter and constituting a smooth continuation of said third portion and smoothly blending with the pylon top surface second portion at a station approximately 17 percent of the aperture diameter rearwardly of the aperture minimum diameter station.

13. A helicopter according to claim 11 and including a second boundary layer control device in said top surface second portion a selected distance downstream of said boundary layer control slot and operative to have fluid discharged therethrough in the direction of the top surface second portion to energize surface flow therealong.

14. A helicopter according to claim 13 and wherein said second boundary layer control mechanism constitutes a series of substantially continuous, vertically extending exhaust ports extending laterally across said top surface second portion and oriented to discharge exhaust fluid flow therethrough substantially parallel to said top surface second portion to energize boundary layer flow along the top surface.

15. A helicopter according to claim 14 and including at least one gas turbine engine and at least one accessory cooling air system, and further including means to discharge gas turbine exhaust gases through at least a portion of said exhaust ports and cooling air through the remainder of said exhaust ports substantially in the direction of flight.

* * * * *